United States Patent
Malhi

[11] Patent Number: 6,040,811
[45] Date of Patent: Mar. 21, 2000

[54] THIN DISPLAY UNIT FOR PORTABLE COMPUTERS

[75] Inventor: Satwinder D. S. Malhi, Garland, Tex.

[73] Assignee: Texas Instruments Incorporated, Dallas, Tex.

[21] Appl. No.: 08/877,773

[22] Filed: Jun. 18, 1997

[51] Int. Cl.[7] ...................................................... G09G 3/36
[52] U.S. Cl. ........................... 345/87; 361/681; 345/905; 348/149
[58] Field of Search ............................ 364/708; 361/681; 345/102, 87, 905; 349/69, 65, 149, 150

[56] References Cited

U.S. PATENT DOCUMENTS

| | | | |
|---|---|---|---|
| 5,168,384 | 12/1992 | Genba ........................................ | 345/58 |
| 5,293,262 | 3/1994 | Adachi et al. ............................ | 349/149 |
| 5,422,751 | 6/1995 | Lewis et al. .............................. | 349/165 |
| 5,436,744 | 7/1995 | Arledge et al. .......................... | 349/150 |
| 5,436,745 | 7/1995 | Voisin et al. ................................ | 349/58 |
| 5,796,576 | 8/1998 | Kim ........................................... | 361/681 |
| 5,805,125 | 9/1998 | Suganuma et al. ........................ | 345/87 |
| 5,815,225 | 9/1998 | Nelson ...................................... | 349/69 |
| 5,835,139 | 11/1998 | Yun et al. ................................ | 361/681 |
| 5,844,773 | 12/1998 | Malhi ...................................... | 361/681 |

*Primary Examiner*—Steven J. Saras
*Assistant Examiner*—Alecia D. Nelson
*Attorney, Agent, or Firm*—Robby T. Holland; Carlton H. Hoel; Richard L. Donaldson

[57] ABSTRACT

A computing device 10 is disclosed herein. A base unit 12 is provided for housing a plurality of computing components and also may include an input/output device such as a keyboard. A display unit 20 can be pivotally coupled to the base unit 12 about a spine 26a. The display unit 20 may include a viewing surface 24. In addition, a flap 50 can be attached to at least one edge of the display 20 and extend outwardly from screen 24. Electronic components 46 may be housed within the flap 50. Alternatively, the electronic components 46 may be housed within the base unit 12 and electrically coupled back to the display units 20.

3 Claims, 4 Drawing Sheets

THIN DISPLAY UNIT FOR PORTABLE COMPUTERS

CROSS-REFERENCE TO RELATED APPLICATIONS

The following commonly assigned patent applications are hereby incorporated herein by reference:

| Pat. or Ser. No. | Filing Date | Attorney Docket No. |
| --- | --- | --- |
| 5,754,159 | 11/20/95 | TI-21933 |
| 5,858,858 | 11/30/95 | TI-21935 |
| 08/566,234 | 12/01/95 | TI-21936 |
| 5,844,773 | 12/01/95 | TI-21937 |
| 5,675,687 | 11/20/95 | TI-21939 |

FIELD OF THE INVENTION

This invention generally relates generally to display devices and specifically to a display device with remotely located associated circuitry.

BACKGROUND OF THE INVENTION

Without limiting the scope of the invention, its background is described in connection with a portable notebook computer system having a display unit that includes a display case, display screen, one or more liquid Crystal Display (LCD) panels and a light source.

The increased demand for portable computing devices, such as laptop and notebook computers, has resulted in a proliferation of technical advances and breakthroughs designed to increase system functionality, performance and convenience. Many of these advances have focused on making the portable computer small, thin and lightweight. Today's computer user, however, demands systems that are more compact, thinner and lighter than ever before.

The obstacles faced by designers in reducing system size and weight relate in large part to the number and types of devices and components options typically found in the more sophisticated fully featured computers. For example, users now demand high resolution graphic color LCD's, high density and high data rate mass storage devices, Integrated Memory Modules, removable diskette drives, spare battery cells and full-sized keyboards.

While many of these components have seen dramatic size and weight reductions over the years, such options still account for a major portion of the system's overall size and weight. Moreover, as users demand more functional and sophisticated systems, the push to miniaturize components becomes greater.

Recently, manufacturers have turned to more creative methods of reducing system size and weight. For example, manufacturers have begun using newer and more efficient designs, higher density Printed Circuit Boards (PCB) and assemblies that package more components in the available system space. Still others employ Application Specific Integrated Circuitry (ASIC) to combine system functions and thereby reduce overall component count. All such methods have been effective to some extent in reducing the physical dimensions and weight of the portable computer.

A subsystem that contributes greatly to overall system size and weight is the computer's display unit. The display unit typically combines a display case, LCD panel light source, display electronics and other components necessary to provide image output capabilities. The typical display unit on today's portable computer is approximately 0.5 inch thick and weighs 360 grams or more.

While many of the reductions in size and weight have focused primarily on decreasing the physical dimensions of the computer's PCB assembly and component options, little or no attention has been paid to the system's display unit. In this regard, an improvement on present portable computing devices that reduces the overall system's physical dimension and weight characteristics without sacrificing display functionality would be a great advantage.

SUMMARY OF THE INVENTION

The present invention teaches a portable computer which can include a display unit which is much thinner than prior art display units. In one embodiment, the notebook computer of the present invention includes a base unit for housing a plurality of computing components such as the computer's processor(s) and memory(ies). A display unit pivotally couples to the base unit about a spine coupled to the rear edge of the base. The display unit can include a LCD panel as is presently known. Unlike the prior art, however, the circuitry for driving the display unit is housed remotely from the display unit. For example, the circuitry may be included within the base unit or within specially added side flaps. This relocation of the drive circuitry allows for a much thinner display than was previously possible.

In one aspect, the display unit may include at least one flap attached to an edge of the visual display. This flap will extend outward from the viewing surface to provide privacy for the computer user. In addition, the flap can be used to house various electronic components. These electronic components will be electrically coupled to the visual display. Various embodiments may include one or two side flaps and/or a top flap depending upon the desired configuration.

The present invention allows for a display which is much thinner than presently possible. Utilizing the concepts of the present invention, the display unit may be as thin as the display electronics (e.g., the LCD display), and an apparatus for spreading light along the display (e.g., a light guide or a reflector). With present LCD technology, this means the display unit may be as thin as 1 mm. This thin size provides advantages over the prior art.

BRIEF DESCRIPTION OF THE DRAWINGS

The above features of the present invention will be more clearly understood from consideration of the following descriptions in connection with accompanying drawings in which.

Corresponding numerals and symbols in the different figures refer to corresponding parts unless otherwise indicated.

DETAILED DESCRIPTION OF ILLUSTRATIVE EMBODIMENTS

The making and use of the various embodiments are discussed below in detail However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Figure 1:
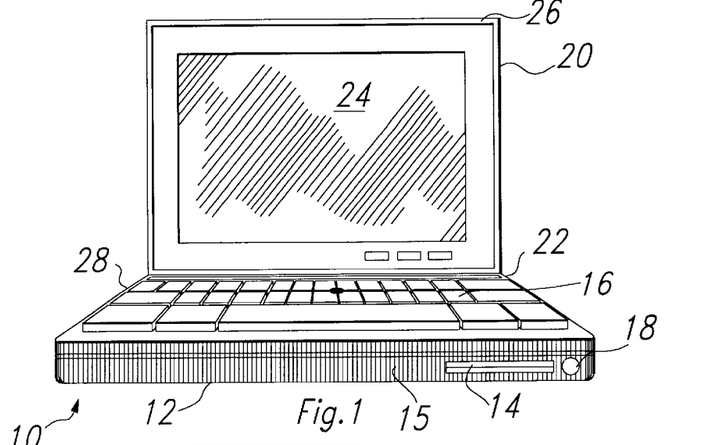
FIG. 1 illustrates a portable notebook computer which may utilize the concepts of the present invention.

In reference to FIG. 1, a portable computing device in the form of a portable notebook computer is shown and denoted generally as 10. While the following description is based upon a portable computer, it should be understood that the present invention applies to any device which has a display including, but not limited to, computers, calculators, organizers, cellular phones and others.

The portable notebook computer 10 has a base 12 for housing various computer options, devices and components depending on the system configuration, features and functionality. For example, this particular portable notebook computer 10 has a diskette drive 14 accessible from the base front 15 of base 12. Also, button 18 protrudes from the base front 15 allowing the user to operate the insertion and/or removal of disks from diskette drive 14. Other options such as internal modems, hard disk drives, memory boards, PCMCIA cards and others may also be contained within base 12. A keyboard 16 is also provided as an input means. The exact configuration of the notebook computer 10 is not critical to this invention.

As shown, base 12 is coupled to a display unit 20 about a spine 22. The display unit 20 comprises the display components and devices needed to permit visual representation of data and information to the user on screen 24. In this example, the base 12 forms a substantially rectangular enclosure for housing a plurality of computing components. Other shapes are also envisioned. Similarly, the display unit 20 can also form a substantially rectangular enclosure for housing a plurality of display components.

Display unit 20 comprises a case 26 which in the preferred embodiment is made of a tough acrylic or polyurethane material capable of withstanding cracking or fading. Utilizing the teachings of the present invention, the display unit 20 is very thin. For example, the display unit may be a total of 2 to 3 mm thick and is preferably about 2 mm thick. The display unit 20 will be described in more detail below.

Screen 24 of the portable notebook computer 10 is fixed to the front of the case 26a and preferably, although not necessarily, forms a substantially flat viewing surface for displaying a visual image. In the preferred embodiment screen 24 is made of a clear see through material and comprises a flat surface area approximately 6" by 8" inches (approximately 10.4 inches diagonal). It should be understood that screen 24 may be of other sizes, dimensions and shapes. The properties of screen 24 permit light generated from within display unit 20 to be perceived by the user.

The spine 22 of the portable notebook computer 10 is maintained near the rear 28 of base 12. In one embodiment, the spine 22 comprises a tubular shaped structure that extends the entire length of the portable notebook computer 10 along display unit 20 and forms a rotatable support to which base 12 and display unit 20 are attached. In this way, display unit 20 can be rotated about base 12 along an axis perpendicular to spine 22 for closing and opening the portable computer notebook 10. While in use, for example, the user can rotate the display unit 20 away from base 12 along spine 22 to expose screen 24. Likewise, the user can close the computer 10 by rotating the display unit 20 towards the base 12. A locking mechanism can be provided to keep the display unit 20 in a fixed location with respect to the base 12.

Figure 2A:
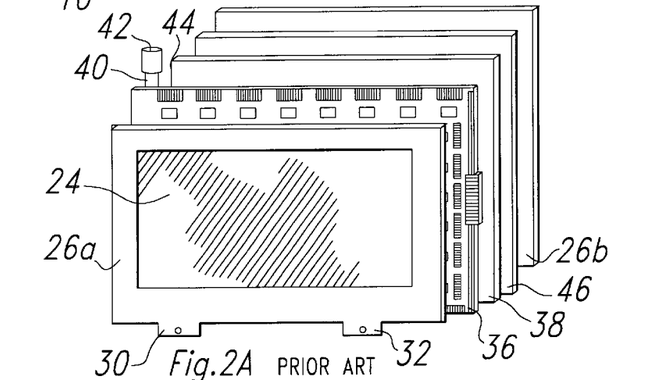
FIGS. 2a and 2b illustrate a prior art display unit which may be used with a portable computer.

Turning now to FIG. 2A, a detailed view of a prior art display unit 20 assembly is shown. The display case front 26a holds screen 24 in place. In one embodiment, the case front 26a is made of a resilient polyurethane material capable of withstanding fading, cracking and shock.

Fastener 30 and fastener 32 secure the case front 26a to the case back 26b to form a self-enclosed housing for various components found in display unit 20. Fastener 30 and fastener 32 also brace the display unit 20 to the portable notebook computer 10 about spine 22 for coupling the base 12 to the display unit 20.

Behind the case front 26a is the display board 36 in the form of one or more Printed Wiring Board (PWB) assemblies. Display board 36 contains a display panel and may also include various display electronics including any components, circuits, devices, wiring and leads used by the system to perform the system's display functions. In the preferred embodiment, display board 36 comprises an LCD (liquid crystal display) panel. The display board 36 fits within the area defined by the case front 26a and case back 26b. As the viewing screen 24 takes up a larger portion of case front 26, less peripheral circuitry can be included on the board. As a result, another PWB 46 is provided and will be described in more detail below.

Also shown in FIG. 2A is a light guide 38 positioned between the display board 36 and the case back 26b. In one embodiment, the light guide 38 is made of an acrylic polyurethane material approximately 0.2" inches thick and coated with a white sheet of light reflective material. The light guide 38 may be rectangular box or a wedge shape. Light guide 38 works in conjunction with light source 40 to disperse light evenly along the surface of the LCD panel 36.

Light guide 38 is used to capture light that enters along any edge of light guide 38 and disperse it evenly along its surface. In this way, light received from light source 40 is dispersed in a substantially even manner along the entire LCD panel 36 surface area.

In the one embodiment, light source 40 is a tube shaped cold cathode fluorescent lamp (CCFC) approximately 9 inches long and 2.0 mm in diameter. As shown, light source 40 has a cap 42 which supports the light source 40 in place on the case back 26b.

During operation, light emitted from light source 40 enters the light guide 38 along a side edge such as edge 44. The reflective material of the light guide 38 captures the emitted light and distributes it evenly across its surface. Being parallel to the light guide 38, LCD panel 36 receives the light from the light source 40 causing the screen 24 to illuminate. The display board 46 controls the display intensity of the light on LCD panel 36 across individual display pixels (not shown) depending on the data and/or information to be shown.

Display electronics PWB 46 is disposed between light guide 38 and case back 26b. This board houses the electronic circuitry which is used to operate the display unit. For example, display electronics PWB 46 may comprise a single PWB which includes row driver circuitry (not shown), column driver circuitry (not shown) and power supply (not shown). Alternatively, display electronics board 46 may comprise more than one PWB for providing the various components.

The display 20 may further include controls (not shown) for adjusting the display, for example, by controlling the intensity of light source 40, the brightness or the contrast.

Figure 2B:
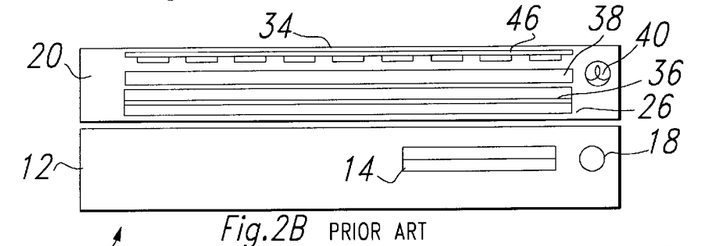

FIG. 2B shows a side view of a portable notebook computer 10 which is known in the art. The display unit 20 includes LCD panel 36, light guide 38, light source 40 and display electronics 46 as described above. One goal of the present invention is to make the this display even thinner.

Figure 3:
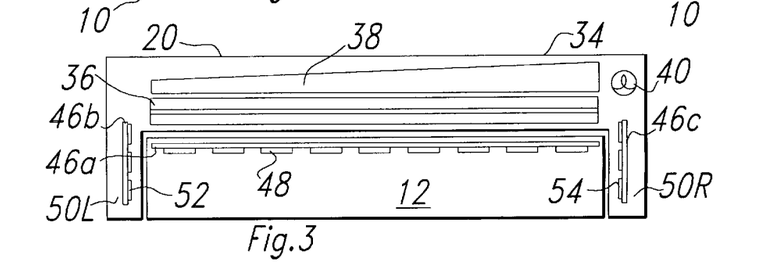
FIG. 3 illustrates a first embodiment portable computer of the present invention.

One way in which this goal may be accomplished by the teachings of the present invention is to eliminate the display electronics board 46 from the display unit 20. FIG. 3 illustrates a first embodiment which accomplished this goal In order to simplify viewing the internal components, FIG. 3 (and other figures herein) has not been drawn to scale.

Referring now to FIG. 3, the display electronics board 46 has relocated from its previous position between case front 26a and case back 26b and divided into a series of three separate PWBs 46a, 46b and 46c. In this embodiment, first display PWB 46a is disposed within the base unit 12. The PWB 46a includes circuitry for operating the LCD panel 36. In one embodiment, the PWB 46a may comprise a flex PWB which is disposed throughout the spine 26a thereby electrically coupling the components 48 to LCD panel 36. The flex PWB 46a is preferably formed of a flex material to be able to withstand the rotation as the display unit 20 is pivoted around the spine 26a.

The embodiment of FIG. 3 also includes side flaps 50L and 50R which outwardly extend from the viewing surface 24 of display unit 20. The side flaps 50L and 50R are provided so as to house electronic components 52 and 54 stored therein. In the preferred embodiment, the side flaps 50L and 50R are between about ¼ inches and 2½ inches long and preferably about ¼ inches to ½ inches thick. The side flaps 50L and 50R may outwardly extend a distance equal to the width of base unit 12. This distance may be shorter or longer, but a longer distance could cause the side flaps 50L and 50R to extend beyond the base unit 12.

In the preferred embodiment, the electronic components 48 disposed within the base unit comprise column drivers for driving the columns of the LCD 36. Detailed operation of the LCD is well-known in the art and for the sake of simplicity will not be described herein. The circuitry 52 disposed within side panel 50L may comprise row drivers also for driving the LCD panel 36. Once again, the operation of row drivers in conjunction with an LCD panel is well-known.

The side flap 50R may house circuitry 54 which includes power supply circuitry for supplying power to light source 40. In practice, the power board 46c may take the form of a miniaturized power supply coupled to the systems main power supply in the base unit 12. The power board 46c provides the electrical energy for LCD panel 36 of display unit 20. Although not shown, the power board will be coupled to a lead which joins the light source 40 as well as leads which may couple to other circuitry within the display unit 20 in the base unit 12.

Figure 4:
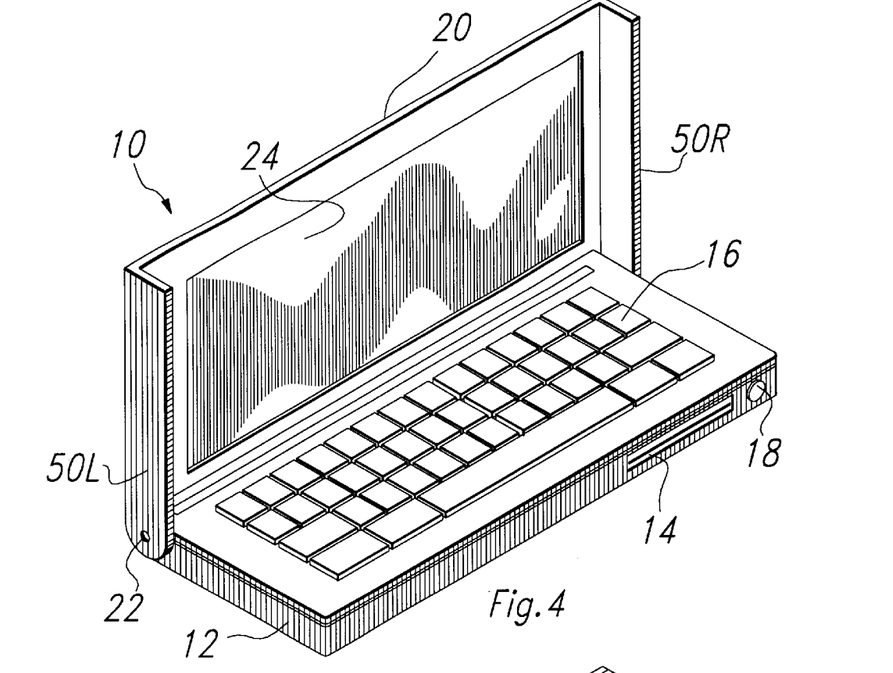
FIG. 4 illustrates a portable computer which includes side flaps.

FIG. 4 illustrates the portable notebook computer 10 of FIG. 3 where display unit 20 is in an upright position. In the illustrated embodiment, the side flaps 50L and 50R extend the entire length of the display unit 20. It is noted, however, that this is not required. The side flaps 50L and 50R may extend over any portion of the edge of the display panel 20. As examples, the side flap 50 may extend from the top to somewhere less than the bottom, may extend from the bottom to somewhere less than the top, or may extend somewhere in the middle without reaching the top or the bottom. Aside from providing additional space to house the circuitry of 48, 52, and 54, the side panels 50 may provide the user with privacy providing an additional advantage. For example, in some situations (e.g., while on an airplane), the user does not want persons adjacent to him to be able to view the screen. This embodiment of FIGS. 3 and 4 will provide this protection.

Figure 5:
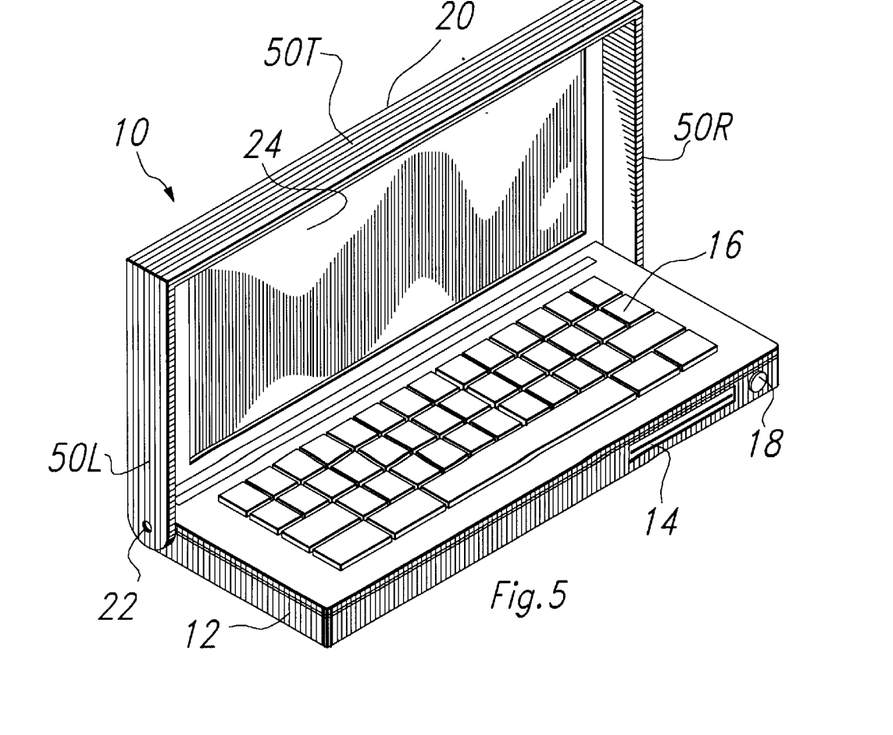
FIG. 5 illustrates a portable computer which includes side flaps and a top flap.

FIG. 5 illustrates another embodiment of notebook computer 10 of the present invention. This embodiment includes a top flap 50T. As with the other flaps, the top flap 50T may house circuitry coupled to the display board 36. For example, the column driver circuits 48 may be located within the top flap to couple to the LCD panel 36. This embodiment provides the advantage of having all the display circuitry housed with the display unit 20. This advantage can be important if one were to manufacture the display independently of the base unit 12 as may often happen in production. As with the side flaps 50L and 50R, the top flap 50T may extend over the entire top edge or only a portion thereof It is also noted that the flaps 50L, 50R, and 50T may comprise a single continuous housed unit or multiple independently housed units which are partitioned from one another. The specific construction is only a matter of design choice and not critical to the present invention.

Figure 6:
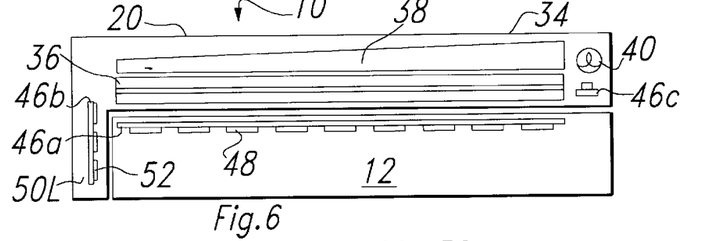
FIG. 6 illustrates a side view of a portable computer which includes a top flap only.

As illustrated by the embodiment of FIG. 6, only a single side flap (or top flap) may be included. In this example, the row driver circuitry 52 is provided in side flap 50L. The power supply circuitry 46, however, is provided in the space beneath light source 40 and the column driver circuitry 46a is provided in the base unit 12. The location of these units may vary and are provided only as examples. The present invention envisions embodiments where one, two, three or more, flaps are provided. In fact, the present invention also envisions an embodiment where no flaps are provided and some or all the circuitry 46a 46b and 46c are relocated in base unit 12.

Figure 7:
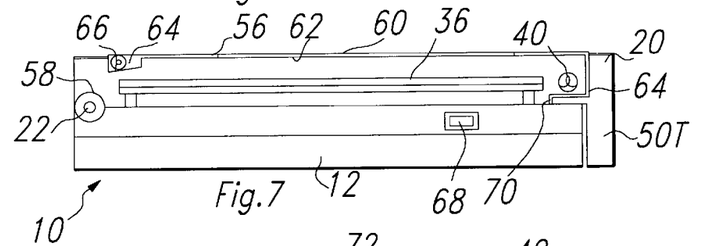
FIGS. 7 and 8 illustrate a first alternate embodiment of a portable computer of the present invention.
Figure 8:
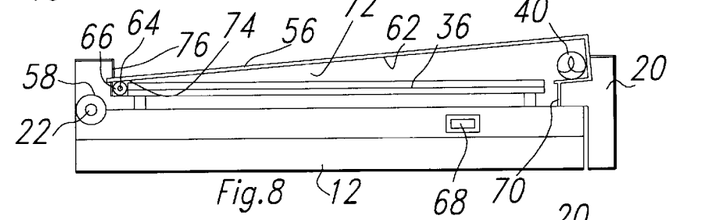

FIGS. 7 and 8 illustrate an alternate embodiment display unit 20 which includes a reflector 56 which replaces light guide 38 in the previously described embodiments. The previous descriptions of the present invention also apply to the embodiment of FIGS. 7 and 8. An embodiment which includes a reflector is disclosed in more detail in co-pending application Ser. No. 08/566,234 filed on Dec. 1, 1995, incorporated herein by reference.

The embodiment of FIGS. 7 and 8 includes a top flap 50T while no side flap 50L or 50 is illustrated. It should be understood that this illustration is by arbitrary choice only and that all of the previous variations and modifications also apply to the embodiment which include reflector 56.

Turning now to FIG. 7, a side view of the portable notebook computer 10 in storage mode is illustrated. As before, the base 12 and the display unit 20 are coupled together about a hinge 58 and spine 22. In the embodiment shown, the display unit 20 is the same length as the base 12 although this is not required.

Coupled to the top of the display unit 20 is a reflector 56 which forms a substantially flat surface of the display unit 20 parallel with a cross-plane of the base 12. In this configuration, the portable notebook computer 10 is in a storage mode.

The reflector 56 has a top surface 60 which in one embodiment is made of the same material as the rest of display unit 20. It should be understood, however, that other materials can be used to construct reflector 56.

The reflector 56 also has a bottom surface 62 which is substantially parallel to the top surface 60 and contained entirely within the display unit 20. The bottom surface 62 of the reflector 56 is coated with a reflective mirrored finish that reflects luminescent light from the light source 40. While no particular type if coating material is essential to the invention, bottom surface 62 is finished in such a way as to allow light to be evenly distributed throughout bottom surface 62.

As shown, in the preferred embodiment LCD panel 36 is maintained substantially parallel to the reflector 56 in the storage mode. It should be understood however, that other configurations of the LCD panel 36 are possible as long as image output capabilities are enabled during use. The reflector 56 is coupled to the display unit at point 64 near one end of the display unit 20 by any of a variety of means. For example, a hinge, bezel joint, splice or other similar mechanism may be used to couple the reflector 56 to the display case 20.

In the preferred embodiment, a hinge 66 is coupled to point 64 joining the display unit 20 to the reflector 56. Hinge 66 permits angular motion of the reflector 56 about one end of the display unit 20. While no particular form of hinge 66 is essential to the invention, hinge 66 may take the form of a bracket, extender, brace or similar device to which the reflector 56 can be secured. In this way, hinge 66 can OPEN/CLOSE or extend in such a way that the reflector 56 can be angled about one end of the display unit 20.

A push-button 68 is shown coupled to the base 12 for automatically controlling the motion of the reflector 56 about the display unit 20. It should be understood that push button 68 may be placed elsewhere on the portable notebook computer 10 without departing from the true spirit of the invention. In operation, a user depresses push-button 68 when ready to use the portable notebook computer 10 to cause the reflector to extend outward from the display case 22. In one embodiment, push-button 68 is internally connected to the reflector 56 and comprises a mechanical lifting device that controls the angular motion of the reflector 56 about the display case 20.

While the light source 40 is shown positioned along the upper edge portion of the display unit 20, it should be understood that the light source 40 may be placed along any display unit 20 edge as long as light emitted from the light source 40 is adequately delivered to the bottom surface 62 of reflector 56 when in use.

Also shown is a support 70 coupled to a harness which holds the light source 40 in place. The support 70 is provided for controlling the motion of the reflector 56 about the base 12 and can extend to support the reflector 56 as it is rotated angularity about the base 12. No particular type of support 70 is essential to the invention, although it should be understood that a variety of mechanisms, such as a push-button, bracket or similar apparatus may be used to support the reflector 56 during motion.

The reflective coating on the bottom surface 62 of the reflector 56 replaces the functionality of the light guide 38 used in the previously described embodiments. Since no light guide 38 is used in the embodiment of FIG. 7, the overall thickness and weight of the display unit 20 is reduced significantly.

It should also be understood by one skilled in the art that the display unit 20 may be removed from the base 12 and placed on a projector so that data or information on screen 24 can be seen as images on an overhead projector. In this configuration, where the display unit 20 is removed from the base 12, the reflector 56 can be removed from the display unit 20 for projection of images from the LCD panel 36 onto an overhead projector surface. An adapter cable (not shown) can be used to join the base 12 to the display unit 20.

Turning now to FIG. 8, a side profile view of a portable notebook computer 10 in the active mode is illustrated. Again, no light guide 38 is present. As illustrated by the profile view, the reflector 56 has been inclined about the base 12, creating a substantially triangular shaped area 72 between the reflector 56 and LCD panel 36. In this particular embodiment, the weight of the display unit 20 is reduced since no light guide 38 is being used to reflect light on the LCD panel 36.

As shown in FIG. 8, a point of contact 74 is created in active mode since the reflector 56 has been inclined sufficiently to make contact with LCD panel 36. Thus, all the light from light source 40 is reflected unto the bottom surface 62 of the reflector 56 and contained within area 72 providing for a substantially even distribution of light on the LCD panel 36.

While the display unit 20 is shown in the closed position with respect to the base 12, it should be understood by one skilled in the art that the display unit 20 may also be opened in this configuration. Specifically, in one embodiment of the active mode configuration, when the user opens the display unit 20, the reflector 56 is automatically inclined as shown. This embodiment eliminates the need for button 68.

A support 76 is shown attached to point 64 near one end of the display unit 20. The support 76 is extended to keep the reflector 56 in place during use in the active mode. In this arrangement, one end of the reflector 56 extends outwardly beyond the display unit 20 so the reflector 56 is visible to the user.

As discussed in reference to FIG. 7, it should be understood by one skilled in the art that the display unit 20 may be removed from the base 12 and placed on a projector so that data or information on screen 24 can be seen as images on an overhead projector (not shown). In this configuration, where the display unit 20 is removed from the base 12, the reflector 56 can be removed from the display unit 20 for projection of images from the LCD panel 36 unto an overhead projector surface. An adapter cable (not shown) can be used to join the base 12, to the display unit 20.

Figure 9:
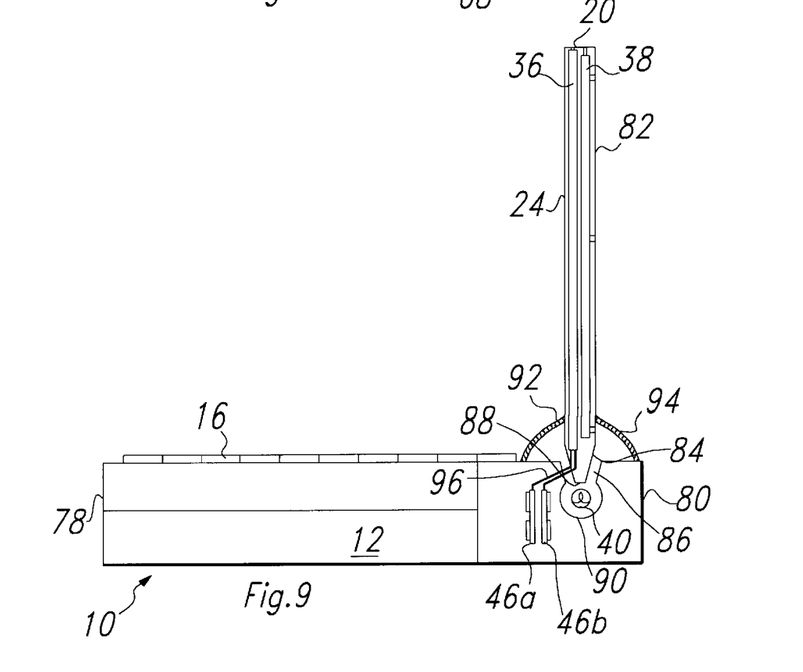
FIGS. 9–11 illustrate variations of a second alternate embodiment of a portable computer of the present invention.
Figure 10:
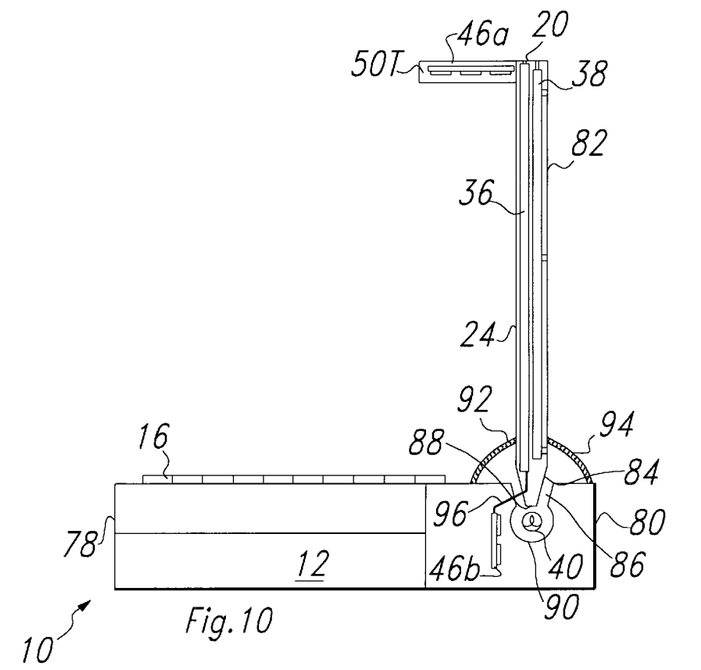
Figure 11:
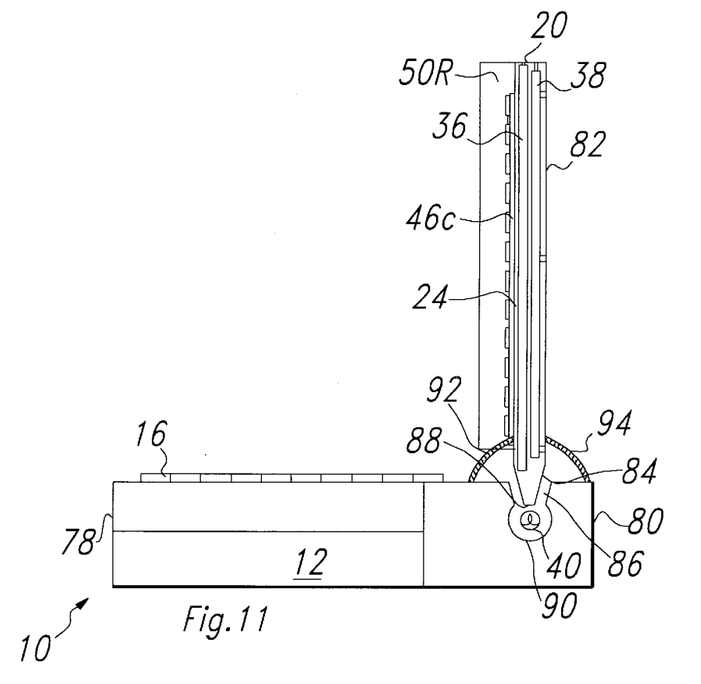

FIGS. 9–11 illustrate variations of an alternate embodiment of the present invention in which light source 40 is disposed within base unit 12. A portable computer with a light source disposed within a base unit is disclosed in more detail in copending Ser. No. 08/566,234, incorporated herein by reference.

Turning now to FIG. 9, a side profile view of the portable notebook computer 10 in accordance with this alternate embodiment of the invention is illustrated. In one embodiment, base 12 measures approximately 8.5" to 10" inches from the base front 78 to the base rear 80. Other width sizes are also available.

FIG. 9 shows the display unit 20 comprising display case 26 coupled to the base 12 via fitting 84 which fits into base opening 86. As shown, opening 86 is funnel shaped to accommodate fitting 84 which likewise has a funnel shaped end. In one embodiment, fitting 84 forms an end of the display case 26 and has an opening 88 which protrudes into the base opening 86.

Opening 88 extends into the display case 26 interior. The light source 40 has been relocated within base opening 86 in a substantially rounded lower cavity 90 which surrounds the light source 40. Thus, in the configuration shown light from the light source 40 shines into the opening 88 of the display case 26 and reached the light guide 38.

In the preferred embodiment, light from the light source 38 is transmitted through opening 88 into the interior of the display case 26. As the light travels into display case 26 it is captured by the light guide 88 and distributed evenly on the light guide 38 surface. As before, the light is transferred unit LCD 36 for viewing by the user on screen 24.

As shown, display case 26 extends substantially perpendicular to base 12. In other embodiments, display case 26 may be positioned differently with respect to base 12 depending on user preferences as long as light from the light source 40 can be adequately conveyed to the light guide 38.

FIG. 9 shows that display unit 20 contains LCD 36 and light guide 38. The entire assembly is coupled to the base 12 with extender 92 and extender 94. In the preferred embodiment, extender 92 and extender 94 are made of a flexible and elastic electromeric material that is sturdy but permits the display unit 20 to be separated from the base 12 by the user. It should be understood, however, that other materials may be used to couple the display unit 20 to the base 12.

Also, FIG. 9 shows that display electronics in the form of display board 46a and display board 46b have been incorporated in the base 12 and coupled to the LCD 36 via flexible connector 96. In the preferred embodiment, display board 46a and display board 46b comprise the LCD column driver and power supply. Thus, these components are no longer taking up space within the display unit 20.

Alternatively, the light guide 38 may be replaced with a reflector (56 in FIG. 7 or 8). This embodiment may include some, all or none of flaps 50T, 50L and 50R.

FIG. 10 illustrates an embodiment which includes a top flap 50T for housing display electronics 46a. For example, circuit board 46a may include the column pixel drives. In this embodiment, the power supply function can be performed by electronics found on PWB 46b which is located adjacent light source 40 and electronically coupled thereto. In this embodiment, the row driver circuitry (not shown) can be housed in base unit 12 or in display unit 20.

Alternatively the row driver circuitry 46c can be housed in a side flap 50R as illustrated in FIG. 11. In this embodiment, the column driver circuitry (not shown) can be housed in a top flap (not shown) in a side flap (50L or 50R) or in base unit 12. Similarly, the power supply for light source 40 can be housed in base unit 12 or in a side flap 50L. It is a matter of design choice whether to store the row driver 46c in a flap on the left or right side of viewing screen 24.

The present invention has been described herein with reference to a specific example of a portable notebook computer. However, any device which includes a display could similarly benefit from the teachings herein. For example, the unit 10 may alternatively comprise a calculator, an electronic organizer, a cellular phone, or a television, as examples.

In addition, the present invention has been described with reference to a liquid crystal diode (LCD) display. It should be understood, however, that other types of displays could equally benefit from the teachings of the present invention. For example, flat panel displays using field emission display technology such as described in U.S. Pat. No. 4,857,799, incorporated herein by reference, would be appropriate candidates for the teachings of the present invention. Other examples include displays fabricated with movable mirror devices such as the Digital Micro-mirror Device™ or DMD™ (see e.g., U.S. Pat. Nos. 5,083,857 and 5,079,544, incorporated herein by reference), electroluminiscent displays and plasma displays.

Throughout this description, the phrase "circuitry" is intended to include, while not being limited to, ASIC (Application Specific Integrated Circuits), PAL (Programmable Array Logic), PLA (Programmable Logic Array), decoders, memories, non-software based processors, or other circuitry, or digital computers including microprocessors and microcomputers of any architecture, or combinations thereof. Words of inclusion are to be interpreted as nonexhaustive in considering the scope of the invention.

Internal and external connections can be ohmic, capacitive, wireless, direct or indirect, via intervening circuits or otherwise. Implementation is contemplated in discrete components or fully integrated circuits in silicon, gallium arsenide, or other electronic material families, as well as in optical-based or other technology-based forms and embodiments.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An electronic device having a display unit, said device comprising:

a base member;

a visual display including a viewing surface for displaying a visual image secured to said base member, said display including:

at lease one flap attached to the at least one edge of said display, and extending outwardly from said viewing surface in a direction substantially normal to said viewing surface;

electronic components housed within said at least one flap, said electronic components electrically coupled to said visual display; and wherein said base member includes top, bottom and side surfaces, said at least one flap extending opposite a said side surface.

2. A portable computer, comprising:

a base unit for housing a plurality of computing components and having a top surface, side surfaces and a back edge;

a keyboard disposed upon said top surface of said base unit;

a display unit pivotally coupled to said back edge of said base unit, said display unit including at least one side flap extending outwardly from said display unit in a direction substantially normal to said display unit, said flap housing electronic components electrically coupled to said display unit; and wherein said base unit includes top, bottom and side surfaces, said at least one flap extending opposite a said side surface.

3. The portable computer of claim 2 further comprising a further flap attached to said visual display and extending outwardly from said display unit in a direction normal to said display unit, said further flap housing other electronic components.

* * * * *

UNITED STATES PATENT AND TRADEMARK OFFICE
CERTIFICATE OF CORRECTION

PATENT NO.      : 6,040,811
DATED           : March 21, 2000
INVENTOR(S)     : Satwinder D. S. Malhi It is certified that error appears in the above-identified patent and that said Letters Patent is hereby corrected as shown below:

<u>Title page,</u>
Item [62], please insert the following:
  -- Related U.S. Application Data
[60] Provisional Application No. 60/020,971, 06/21/96 --

Signed and Sealed this

Twenty-fifth Day of March, 2003

JAMES E. ROGAN
*Director of the United States Patent and Trademark Office*